US008903225B2

(12) United States Patent  
Ohya et al.

(10) Patent No.: US 8,903,225 B2  
(45) Date of Patent: Dec. 2, 2014

(54) VIDEO EDITING DEVICE, VIDEO EDITING METHOD, PROGRAM, AND MEDIUM IN WHICH THE PROGRAM IS RECORDED

(75) Inventors: Yasuo Ohya, Tokyo (JP); Sunao Wada, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/366,675

(22) Filed: Feb. 6, 2012

(65) Prior Publication Data

US 2012/0275768 A1 Nov. 1, 2012

(30) Foreign Application Priority Data

Apr. 26, 2011 (JP) ................ P2011-098226

(51) Int. Cl.
| | |
|---|---|
| *H04N 5/76* | (2006.01) |
| *G11B 27/034* | (2006.01) |
| *H04N 5/765* | (2006.01) |
| *G11B 27/028* | (2006.01) |

(52) U.S. Cl.  
CPC ........... *G11B 27/028* (2013.01); *G11B 27/034* (2013.01); *H04N 5/765* (2013.01)  
USPC .......................................... 386/280; 386/282

(58) Field of Classification Search  
None  
See application file for complete search history.

(56) References Cited

U.S. PATENT DOCUMENTS

| 2005/0254782 A1* | 11/2005 | Hsu ................................. 386/52 |
| 2009/0092375 A1* | 4/2009 | Berry et al. ..................... 386/95 |
| 2010/0118191 A1* | 5/2010 | Chevallier et al. ............ 348/473 |
| 2010/0138365 A1* | 6/2010 | Hirvela et al. .................. 706/12 |

FOREIGN PATENT DOCUMENTS

| JP | 2002-232832 | 8/2002 |
| JP | WO 2004/095374 A1 | 11/2004 |
| JP | 2005-191892 A | 7/2005 |
| JP | 2009-110460 | 5/2009 |
| JP | 2011-18238 | 1/2011 |
| JP | 2011-34127 | 2/2011 |

OTHER PUBLICATIONS

Japanese Office Action Issued Feb. 19, 2013 in Patent Application No. 2011-098226 (with English translation).  
Office Action issued Nov. 26, 2013, in corresponding Japanese Application No. 2011-098226 (with English translation).

* cited by examiner

*Primary Examiner* — William C Vaughn, Jr.  
*Assistant Examiner* — Eileen Adams  
(74) *Attorney, Agent, or Firm* — Oblon, Spivak, McClelland, Maier & Neustadt, L.L.P.

(57) ABSTRACT

A video editing device includes a storage unit, a detection unit and an composite unit. The storage unit stores a detection target, a similarity determination condition for determining a similarity of an original video content to the detection target, and a message in association with one another. The detection unit determines in accordance with the similarity determination condition whether or not the detection target is included in the original video content. The composite unit adds the message to the original video content in a case where a determination result by the detection unit indicates that the detection target is included in the original video content.

10 Claims, 5 Drawing Sheets

52 Condition table

| | Similarity determination condition | | Message | Insertion position |
|---|---|---|---|---|
| | Similarity score S | Number N of consecutive frames | | |
| Search number 1 | 85% > S ≧ 60% | N ≧ 5 | This place seems to be XX gate. | Detected all frames |
| Search number 2 | S ≧ 85% | N ≧ 8 | What is shown is XX gate, and to the left and right of the XX gate ... | Detected all frames |
| Search number 3 | S ≧ 50% | N ≧ 5 | Attractive constructions and landscapes remain at Asakusa. | Detected all frames |
| Search number 4 | S ≧ 30% | N ≧ 10 | A local character may be hidden in this scene. | 1 to 5 frame of detected frames |
| ... | ... | ... | ... | ... |
| Search number m | S ≧ 20% | N ≧ 20 | The character which few persons know may be hidden into this scene. | Detected all frames |

VIDEO EDITING DEVICE, VIDEO EDITING METHOD, PROGRAM, AND MEDIUM IN WHICH THE PROGRAM IS RECORDED

CROSS-REFERENCE TO RELATED APPLICATION

This application is based upon and claims the benefit of priority from the prior Japanese Patent Application No. 2011-098226, filed on Apr. 26, 2011, the entire contents of which are incorporated herein by reference.

TECHNICAL FIELD

Embodiments of the invention relate to a video editing device for editing videos, a video editing method, a program and a medium in which the program is recorded.

BACKGROUND ART

In tourist spots such as theme parks and sightseeing areas, tourists shoot videos by using camcorders carried by themselves, and then record the shot videos as souvenir videos.

Editing of the videos of this kind by adding thereto information related to the videos can enhance the value of the original videos or make the videos impressive to the viewers. However, it is not easy for the people who shot the videos to edit the videos by themselves.

Meanwhile, in such tourist spots, videos of families or friends, or videos of characteristic landscapes, constructions or the like in the spots are often shot.

In this respect, a system to combine a shot video with a frame or a character of a theme park has been proposed (refer to JP, P2002-232832A).

Such conventional services give value to shot videos as souvenirs. The conventional services, however, can only combine an original video with a previously prepared image in a fixed manner, and thus cannot make the resultant video more valuable than a souvenir video.

DETAILED DESCRIPTION

According to one embodiment, a video editing device includes:

a storage unit to store a detection target, a similarity determination condition for determining a similarity of an original video content to the detection target, and a message in association with one another;

a detection unit to determine in accordance with the similarity determination condition whether or not the detection target is included in the original video content; and an composite unit to add the message associated with the detection target to the original video content in a case where a determination result by the detection unit indicates that the detection target is included in the original video content.

An embodiment will be described below in detail with reference to the drawings.

Figure 1:
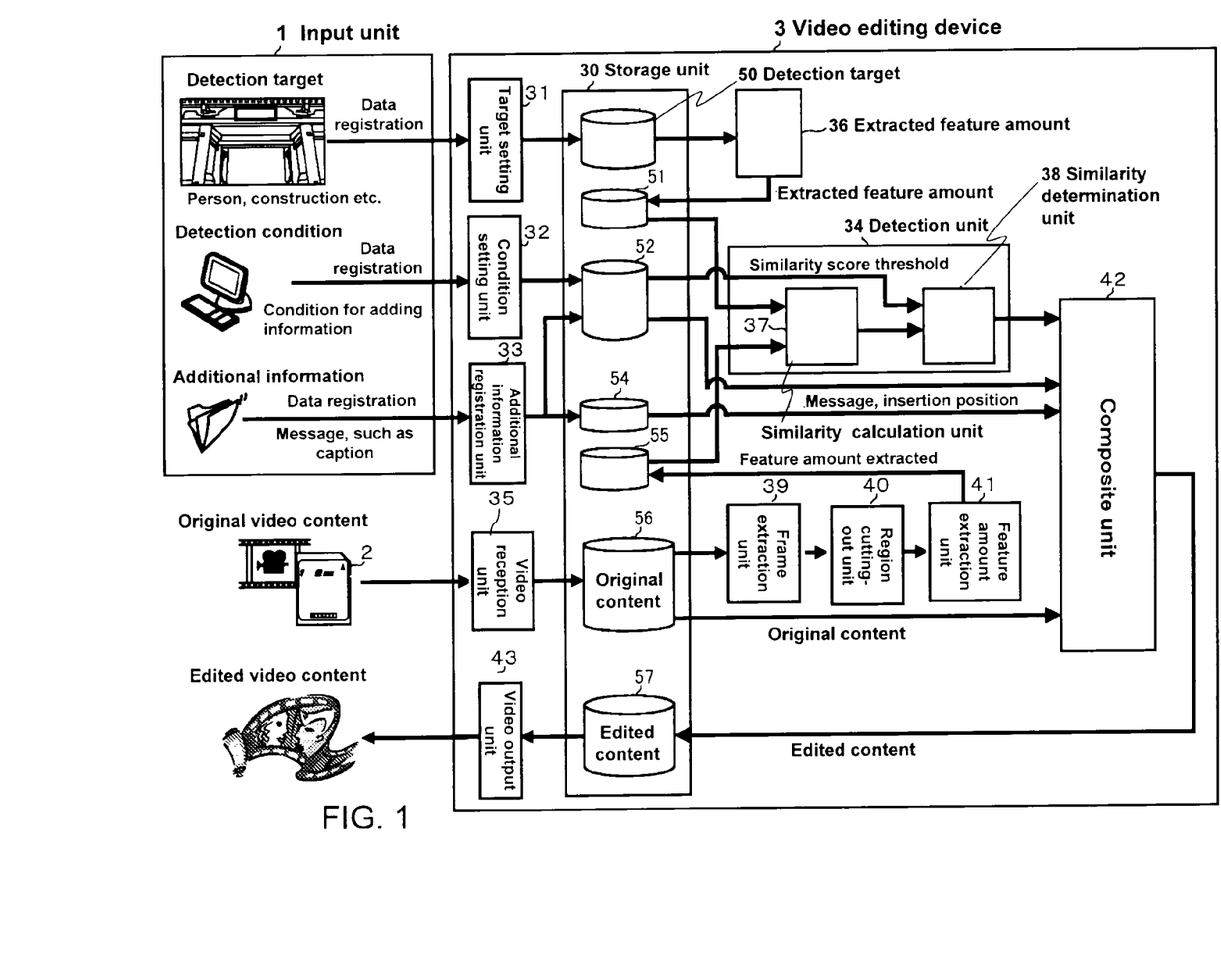
FIG. 1 shows a schematic configuration of a video editing system of a first embodiment.

FIG. 1 is a diagram showing a configuration of a video editing system of the embodiment.

As shown in FIG. 1, the video editing system of the embodiment includes a video editing device 3, and an input unit 1 for setting editing conditions to the video editing device 3. The video editing device 3 reads an original video content (hereinafter, referred to as an "original content") including data such as video and sound from a recording medium 2, edits the original video content, and produces the edited video content (hereinafter, referred to as an "edited content"). The recording medium 2 is an SD memory card, a Memory Stick or a DVD-ROM, for example. Additionally, a storage device such as an optical drive device, and a display device for displaying an editing target video are connected to the video editing device 3 when needed. Note that, "SD" and "Memory Stick" are registered trademarks.

The video editing device 3 previously records editing conditions for the original content and adds information such as a message to the original content in accordance with the editing conditions.

Examples of the editing conditions include a detection target, a detection condition, information to be added, and an insertion position of information. The input unit 1 is used to input such editing conditions to the video editing device 3.

The input unit 1 includes a keyboard used by a user to input a detection condition or the like to the video editing device 3, a network such as a LAN through which an image or sound of a person, a construction or the like stored in an external storage device is inputted to the video editing device 3 as a detection target, and a communication interface of the network.

The video editing device 3 includes a storage unit 30, a target registration unit 31, a condition setting unit 32, an additional information registration unit 33, a detection unit 34, a video reception unit 35, feature amount extraction units 36, 41, a similarity score calculation unit 37, a similarity determination unit 38, a frame extraction unit 39, a region cutting-out unit 40, an composite unit 42, and a video output unit 43.

The video editing device 3 is realized by a computer in which a memory, a CPU, a hard disk drive and a communication interface are installed, for example. The storage unit 30 is realized by the memory, the hard disk drive, or the like. A program installed in the hard disk drive, and the CPU, which reads this program into the memory and then executes the program, realize the target registration unit 31, the condition setting unit 32, the additional information registration unit 33, the video reception unit 35, the feature amount extraction units 36, 41, the similarity score calculation unit 37, the similarity determination unit 38, the frame extraction unit 39, the region cutting-out unit 40, the composite unit 42, and the video output unit 43.

The storage unit 30 previously stores a detection target 50, a condition table 52, a message 54, and an original content 56.

The target registration unit 31 receives an image of a person or a construction that is desired to be detected, i.e., a detection target, and an attribute of the image, and stores the image and the attribute of the image in the storage unit 30 as the detection target 50. In addition, the target registration unit 31 records the file name and attribute of the image in a detection target table 50a (refer to FIG. 2) for each search number, which corresponds to the search order. Note that, in a case where the same detection target is searched for under different search conditions, the same search target is set in different search numbers among search numbers 1 to m in the detection target table 50a. The detection target 50 includes a search target (image) and the detection target table 50a. The target registration unit 31 has a function to specify a region set to be a target in the search target.

The target registration unit 31 acquires data from a device connected via a LAN or a USB interface or acquires data from a recording medium by reading the data with use of a reading device such as a memory card reader or a DVD drive device. Note that, means for acquiring data from outside is not limited to the ones described herein, and the invention is not limited to the ones described in the embodiment.

Figure 2:
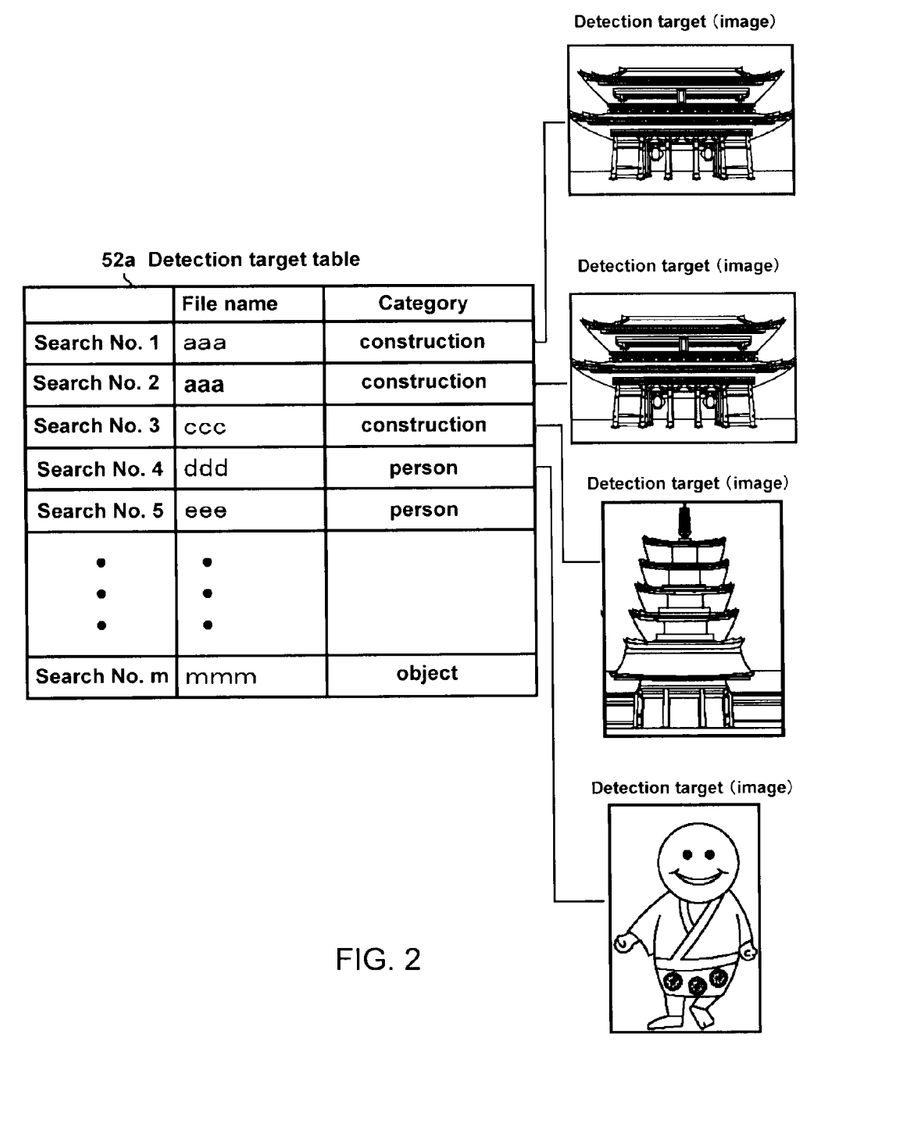
FIG. 2 is a diagram showing a detection target table.

As shown in FIG. 2, the file name and category (classification, type) of a detection target are associated with each other for each search number in the detection target table 50a.

In a search number 1, for example, the file name is "aaa" and the category is "construction." In a search number 2, the file name is "aaa" and the category is "construction." Moreover, in a search number 3, the file name is "ccc" and the category is "construction." Furthermore, in a search number 4, the file name is "ddd" and the category is "person." In the detection target table 50a, the search number 1 and the search number 2 correspond to the same detection target, but the detection conditions of the search number 1 and the search number 2 are different as will be described later.

Here, although the detection target is assumed to be an image, a video or sound may be set as the detection target by adjusting the feature amount extraction unit 36 to be described later. A plurality of images may be provided for a single object. For the purpose of further improving the detection accuracy, it is possible to use a plurality of images obtained by shooting a single object from various angles or a plurality of images obtained by shooting a single object with different brightness levels.

The condition setting unit 32 receives a condition for adding information to the original content, then records the condition in the condition table 52 and stores the condition table 52 in the storage unit 30. To put it specifically, the condition setting unit 32 can edit a similarity determination condition in accordance with a request.

Figure 3:
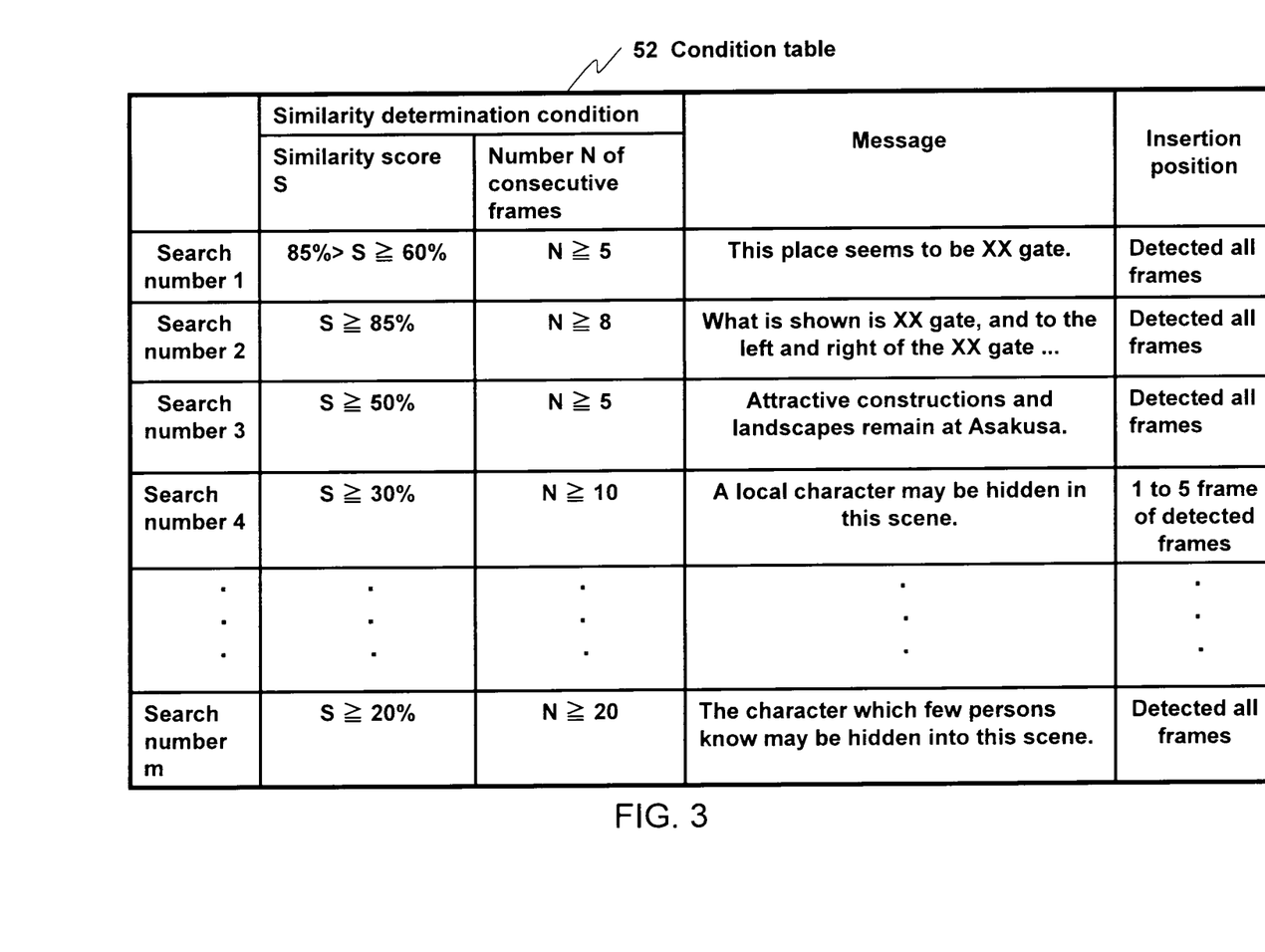
FIG. 3 is a diagram showing a condition table.

As shown in FIG. 3, in the condition table 52, a similarity determination condition (a similarity score and the number of detected frames), information to be added (hereinafter, described as a message), and an insertion position in association with one another are stored for each search number. The similarity determination condition is used as the condition for adding the message. The insertion position shows a frame of the video to which the message is added.

To put it specifically, the condition table 52 stores, for each search number, the similarity determination condition for determining the similarity of the original content to the detection target, the message to be added to the original content when this condition is matched, and the insertion position for adding the message to the original content, in association with one another. In the condition table 52 shown in FIG. 3, the search number 1 and the search number 2 correspond to the same detection target, but different similarity determination conditions and different messages are set in the search numbers 1 and 2, respectively. Accordingly, a different message can be added to the original content in accordance with the similarity to the detection target.

The similarity determination condition is inputted to the video editing device 3 via a keyboard connected to the video editing device 3. Meanwhile, it is also possible to display a graphic user interface (GUI) on the screen of a computer (input terminal) connected to the video editing device 3 via a LAN or the like, and to allow input of the condition to the video editing device 3 via the GUI, for example.

The additional information registration unit 33 receives the message to be added to the original content as well as the insertion position where the message is inserted and records the message as well as the insertion position in the condition table 52 and the message 54. The condition table 52 and the message 54 are recorded in the storage unit 30. The message is, for example, a sentence to be displayed as a caption or a sentence to be superimposed on the video.

The additional information registration unit 33 acquires data from a device connected via a LAN or a USB interface, or reads data from a medium such as an SD memory card or a CD-ROM, or receives data from a computer connected via a LAN or the like. The method for inputting data and the method for receiving data are not limited to the ones described in the embodiment.

The video reception unit 35 receives an original content from outside of the video editing device 3 and saves the original content in the storage unit 30. The video reception unit 35 acquires an original content from a device connected via a LAN or a USB interface, or reads an original content from the recording medium 2 such as an SD memory card or a DVD. The method for receiving an original content is not limited to the ones described in the embodiment.

Various video formats such as MPEG-2, 3GP, AVI and H.264/MPEG-4 AVC are assumed to be used as the formats of original contents. Note that, the formats are not limited to the ones mentioned herein. An original content includes an image frame.

Moreover, it is possible to perform primary editing on a video shot by a camcorder and then to input the edited video to the video editing device 3 as an original content. Moreover, the video editing device 3 may include a primary editing function and produce a digest video by deleting an unnecessary portion from the original content. Here, the video editing device 3 performs secondary editing on the digest video and adds a message to the digest video.

The feature amount extraction unit 36 calculates (extracts) a feature amount 51 of a detection target from the detection target 50 stored in the storage unit 30 and stores the extracted feature amount in the storage unit 30.

The method for extracting a feature amount is not limited to any particular method. The method for extracting a feature amount of a recognition target from a color image, for example, may be color-CoHOG (Co-occurrence Histograms of Oriented Gradients), CoHED (Co-occurrence Histograms of Pairs of Edge Orientations and Color Differences), CoHD (Co-occurrence Histograms of and Color Differences), and the like. However, the method for extracting a feature amount in the invention is not limited to these methods.

The detection unit 34 includes the similarity score calculation unit 37 and the similarity determination unit 38. The detection unit 34 determines, in accordance with the similarity determination condition set for each search number in the condition table 52, whether or not a detection target is included in the original content 56 and notifies the composite unit 42 of the determination result.

The similarity score calculation unit 37 compares a feature amount 55 of a frame of the original content extracted by the feature amount extraction unit 41 and the feature amount 51 of the detection target and thereby calculates a similarity score indicating a degree of similarity therebetween.

The similarity determination unit 38 determines the similarity between the images in accordance with the similarity score calculated by the similarity score calculation unit 37 and the similarity determination condition read from the condition table 52.

The similarity determination unit 38 compares the calculated similarity score with the similarity score of the determination condition. When the calculated similarity score satisfies the similarity score of the determination condition, the similarity determination unit 38 further evaluates the frame in terms of the condition indicating a required number of detected frames.

The similarity determination unit 38 performs the similarity determination by checking the calculated similarity score against the similarity determination condition in the condition table 52. In a case where the original content matches the determination condition, the similarity determination unit 38 outputs the result of similarity determination, the message to be added, and the insertion position of the message (time axis information of the video) to the composite unit 42. Note that, the similarity determination unit 38 may notify the composite unit 42 of the search number and the result of similarity determination, and the composite unit 42 may read the message and the insertion position from the message 54.

For the search number 1, for example, upon detection of five consecutive frames each having a similarity score S of 65%, the similarity determination condition for the search number 1 is satisfied. This similarity determination condition requires "a moderate similarity score and also a moderate number of detected frames." In this case, the similarity determination unit 38 outputs the result of similarity determination, a probable message, i.e., "this place seems to be XX gate," and the insertion position.

In addition, for the search number 2, upon detection of at least eight consecutive frames each having a similarity score S of 85% or higher, the similarity determination condition for the search number 2 is satisfied. This similarity determination condition requires "a high similarity score and a large number of detected frames." In this case, the similarity determination unit 38 outputs the result of similarity determination, a definite message, i.e., "what is shown is XX gate, and to the left and right of XX gate . . . ," and the insertion position.

Furthermore, for the search number 4, upon detection of at least ten consecutive frames each having a similarity score S exceeding 30%, the similarity determination condition for the search number 4 is satisfied. This similarity determination condition requires "a low similarity score but a large number of detected frames." In this case, the similarity determination unit 38 outputs the result of similarity determination, a message prompting checking, i.e., "a local character may be hidden in this scene," and the insertion position.

A message that arouses the interest of the viewers is registered in the condition table 52 in accordance with the detection target and the similarity determination condition.

In a case where there are a plurality of candidate messages, it is conceivable to output a message corresponding to a similarity determination condition that requires a higher similarity, or to simultaneously output the plurality of messages. In addition, the insertion position of a message is previously set in the case of the above description. However, it is also possible to add a message to all of the frames satisfying the similarity score condition in the determination condition without providing the insertion position, for example.

Moreover, the techniques used for the feature amount extraction method and for the similarity determination are known by JP, P2011-18238A, JP, P2009-110460A, for example. These techniques can be used in the embodiment. Note that, the techniques shown herein are only examples, and there are a feature amount extraction technique and a similarity determination technique other than the techniques mentioned herein, and any method can be used.

The frame extraction unit 39 extracts, one by one, the frames of an original content stored in the original content 56 in the storage unit 30. The type of frame serving as the key is an MPEG-2 I frame or the like, for example, and other than the I frame, a frame serving as a representative for each scene may be extracted, for example.

The region cutting-out unit 40 cuts out a region for comparison with the feature amount 51 of the detection target previously registered in the storage unit 30 from the frame extracted by the frame extraction unit 39.

The feature amount extraction unit 41 extracts a feature amount from the image cut out by the region cutting-out unit 40 and stores the feature amount in the feature amount 55 in the storage unit 30.

The composite unit 42 adds the message to the original content on the basis of the determination result indicating that the similarity determination condition is satisfied, the message, and the insertion position, which are outputted from the detection unit 34 (similarity determination unit 38). The composite unit 42 produces an edited content by adding the message to the original content as a caption and stores the edited content in the edited content 57 in the storage unit 30.

To put it specifically, on the basis of the determination result indicating that the detection target is included in the original content, i.e., that the original content satisfies the similarity determination condition, the composite unit 42 reads the message corresponding to the similarity determination condition from the storage unit 30 and adds the message to the original content. To put it more specifically, the composite unit 42 takes into consideration the number of detected frames each having a similarity score to the detection target which is equal to or greater than a predetermined value, or the consecutiveness of the frames, and then adds the message to the original content.

For adding a message to an original content, a method to combine a message with a content by superimposing the message on the content is available, for example. Moreover, in a case where a caption area is provided as in the case of DVD, Blu-ray, or the like, a method to set (insert) the message in the area is available. In a case where a message is set in the caption area, operation to turn ON/OFF the displaying of the message is available during viewing of the content. Any of the methods can be used for adding a message. Blu-ray is a registered trademark. Meanwhile, addition of a message to an original content does not have to be necessarily performed by adding the message as a caption and may be performed by superimposing the message onto the screen of the video.

The video output unit 43 sends the edited content combined with the message to outside of the video editing device 3. The edited content can be sent via a network connection using a LAN, or via a recording medium such as a CD-ROM, a DVD-ROM, or a Blu-ray disc, for example.

Figure 4:
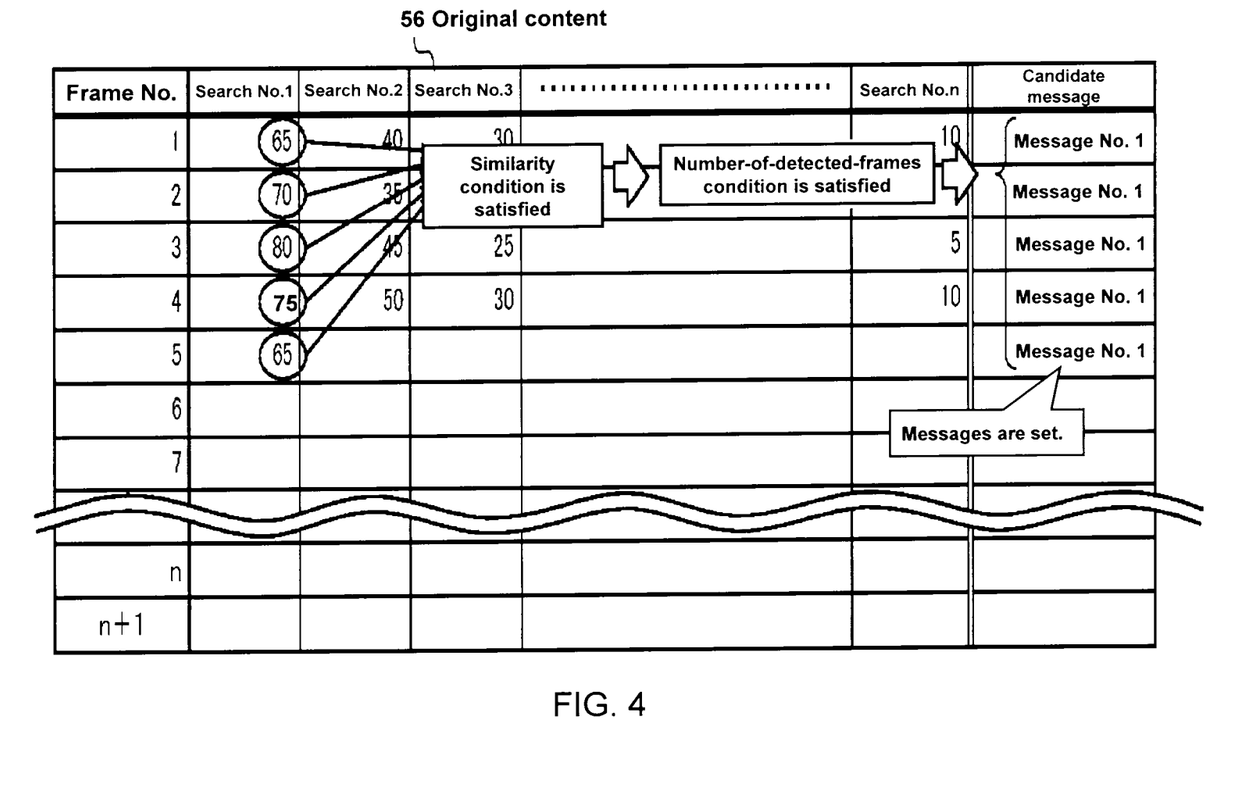
FIG. 4 shows an example of how a candidate for a message to be inserted on the basis of a detection result is set in a content.

Operation of the video editing system of the embodiment will be described below with reference to FIG. 4 and FIG. 5. The video editing system of the embodiment prepares for editing an original content, first.

Upon input of an image of a person, a construction and the like that are desired to be detected to the video editing device 3 as detection targets by the input unit 1, the target registration unit 31 receives and then stores the detection target in the storage unit 30. In addition, the target registration unit 31 writes the detection target and the attribute of the detection target in the detection target table 50*a* for each search number in accordance with the input order of the detection targets.

In addition, upon input of a condition for adding a message to the video editing device 3 when a detection target is inputted to the video editing device 3, the condition setting unit 32 sets the condition in the condition table 52 as a similarity determination condition.

For example, the condition table 52 is set to have, as the similarity determination condition, a similarity score condition in terms of a similarity score to be calculated from the feature amount of an original content and the feature amount of a detection target, and a number-of-detected-frames condition in terms of the number of frames satisfying the similarity score condition. The number-of-detected-frames condition indicates a required number of consecutive frames satisfying the similarity score condition.

Moreover, upon input of a message to be added to an original content and an insertion position to the video editing device 3 by the input unit 1, the addition information registration unit 33 receives the message and the insertion position and sets the message and the insertion position in the condition table 52 and also stores the message and the insertion position in the message 54 of the storage unit 30.

The feature amount extraction unit 36 extracts a feature amount from a detection target stored in the storage unit 30 and stores the feature amount in the feature amount 51 in the storage unit 30. Accordingly, the preparation for editing the original content ends.

Next, editing processing of an original content will be described.

Figure 5:
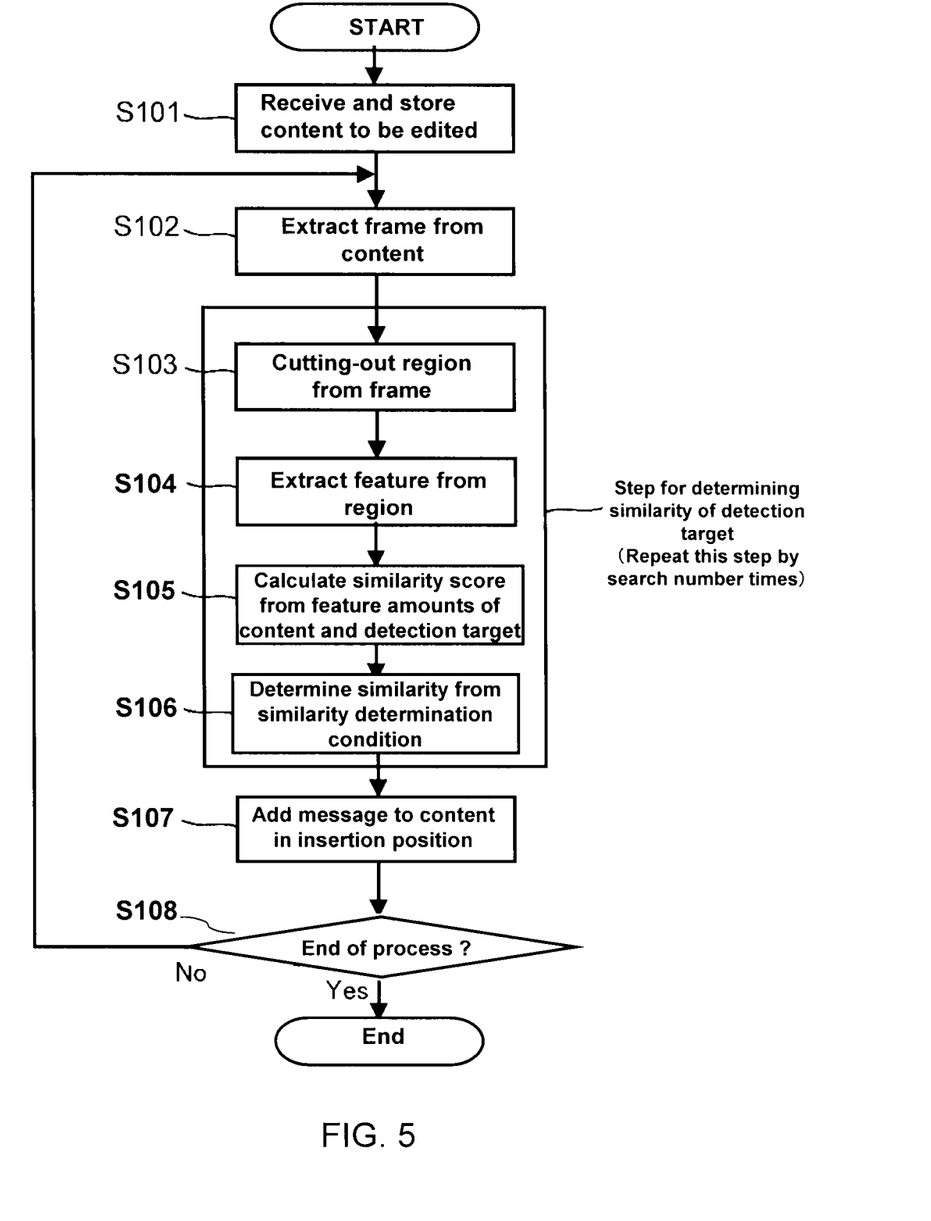
FIG. 5 is a flowchart showing operation of the video editing system.

Upon input of an original content to the video editing device 3 from outside, the video reception unit 35 receives the original content and stores the received original content in the original content 56 in the storage unit 30 (step S101 in FIG. 5).

The frame extraction unit 39 extracts one frame from the original content stored in the storage unit 30 (step S102). The type of frame serving as the key is an MPEG-2 I frame, for example. Meanwhile, a frame serving as a representative for each scene may be extracted, for example.

The region cutting-out unit 40 cuts out a region for comparison with a previously registered feature amount of a detection target from the frame extracted by the frame extraction unit 39 (step S103).

The feature amount extraction unit 41 extracts a feature amount from the image cut out by the region cutting-out unit 40 and stores the feature amount in the feature amount 55 in the storage unit 30 (step S104).

Subsequently, the similarity score calculation unit 37 reads the feature amount of the original content and the feature amount of the detection target from the storage unit 30, and then compares the read two feature amounts and thereby calculates the similarity score therebetween on the basis of the degree of matching between the feature amounts (step S105).

The similarity determination unit 38 determines the similarity between the images on the basis of the similarity score calculated by the similarity score calculation unit 37 and the similarity determination condition in the condition table 52 (step S106).

How the similarity is determined in step 5106 will be described with reference to FIG. 4. FIG. 4 shows similarity of the current frame and the previous frames for each search number. Here, a case of determining whether or not the frame with the frame number 5 matches the similarity determination condition of the search number 1 will be described.

According to the condition table 52, the similarity score condition is that the similarity score S is 85%>S≥60% and also the number-of-detected-frames condition is N≥5 in the similarity determination condition of the search number 1. The frame with the frame number 5 has 65% of similarity score to the detection target of the search number 1 and thus satisfies the similarity score condition. Moreover, any of the nearest five frames including the frame with the frame number 5 satisfies the similarity score condition. Accordingly, the frame with the frame number 5 satisfies the number-of-detected-frames condition. Since the frame with the frame number 5 satisfies the similarity score condition and the number-of-detected-frames condition, the similarity determination unit 38 determines that the frame with the frame number 5 matches the similarity determination condition of the search number 1. Thus, the message of the search number 1 is set as an insertion message candidate as shown in FIG. 4.

Note that, in a case where there are a plurality of search numbers, the processing from step S103 to step S106 is performed for each of the search numbers. Accordingly, as shown in FIG. 4, the similarity to the detection target set in each of the search numbers 1 to m is calculated for the frame with each frame number.

Upon end of the determination of the similarity between the images of the frames and the detection targets of the respective search numbers, the detection unit 34 notifies the composite unit 42 of the determination result. To put it specifically, in a case where a frame matches the similarity determination condition, the detection unit 34 outputs the result of similarity determination, the message to be added and the insertion position to the composite unit 42.

As an upper level determination, the detection unit 34 detects whether or not a detection target is included in the original content in accordance with a similarity determination condition in the condition table 52.

The composite unit 42 adds the message to the original content in accordance with the determination result indicating that the detection target is included in the original content, the message and the insertion position (step S107). Alternatively, upon notification of the search number and the detection result, the composite unit 42 adds the message to the original content in accordance with the message and the insertion position which are read from the message 54 in the storage unit 30 (step S107).

Subsequently, when there is no instruction to end the processing (No in step S108), the processing from step S103 to step S107 is performed for the next frame. Upon end of the processing for all of the frames (Yes in step S108), the video output unit 43 writes the edited content to which the message has been added (combined) to a recording medium (a CD-R, a DVD-R, each type of a memory card or the like) for external output. As the recording medium, a CD-R, a DVD-R, each type of a memory card or the like is used. Note that, in a case where editing is performed on the basis of a request received via a network or the like, the edited content is sent to the originator of the editing request. In addition, addition of the information (message) to the original content does not have to be necessarily performed as addition of a caption, and the information may be superimposed onto the screen of the video.

Here, a service utilizing the video editing system of the embodiment will be described. According to the video editing system of the embodiment, a previously inputted detection target and images included in an original content are compared. Then, a message is added to a frame of a similar image, and the edited content is outputted. Thus, the video editing system of the embodiment can provide the following service.

An example of a case where the video editing system of the embodiment is applied to a video shot in a theme park will be described. The video editing system of the embodiment is applied to an original video content in which a family or a friend is shot together with a character of the theme park. In a case where it is detected that, in the original video content, frames each having a similarity score to an image of the character that exceeds a certain similarity score are consecutive for at least a certain period of time or at least a certain number of frames, the video editing system adds a message just like the contents which the character of the theme park speaks to the video viewer to the frames in which the character is detected. Thus, a new sensation can be added to the original video content.

In addition, the video editing system of the embodiment can add a message to a video entered in a video contest with a predetermined theme. In a case where a target image designated by the host of the contest exists in a video entered in the contest, for example, the video editing system outputs a video in which a winning notification message is added to the frame in which the target image is shown.

Moreover, in a case where at least a certain number of frames each having a high similarity score to a representative building or construction in a tourist spot are detected in an original video content shot in the tourist spot, the video editing system of the embodiment adds a message such as an explanation for the building or construction to the frames.

Moreover, it is also possible to register a video of a predetermined product to the video editing system of the embodiment in advance so that the video editing system of the embodiment can add information about the product when a video of the product is detected in an original video content.

Furthermore, when a video of a registered person is detected in a video shot by a monitoring camera installed in a monitoring target area where a particular person enters and leaves, the video editing system of the embodiment adds the attribute and name of the detected person to the output video and displays the video.

As described above, according to the video editing system of the embodiment, new value can be added to an original video. In addition, it is possible to almost automatically execute a series of processing operations including reception of an original content, creation of an edited content by adding a message to the original content, and delivery (sending) of the created edited content to the originator of the request.

As described above, according to the above described embodiment and the application of the embodiment, there are provided a video editing device, a video editing method, a program, and a recording medium in which the program is recorded, which are capable of adding new value to a shot video.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Furthermore, each configuration element described in the above embodiment may be implemented by a program installed in a storage such as a hard disk drive of a computer, or the functions of the present invention may be implemented by a computer in such a way that the above program is stored in a computer-readable electronic medium and then read by the computer from the electric medium.

Examples of the recording medium include recording media such as a CD-ROM and a DVD-ROM, as well as a flash memory, removable media and the like. Moreover, the configuration elements may be distributed and stored in different computers connected to each other via a network and may be implemented by communications between the computers functioning the configuration elements.

What is claimed is:

1. A video editing device comprising:
   a storage unit to store, in association with one another, each of a detection target, a similarity determination condition for determining a similarity of an original video content to the detection target, and a message to be displayed on an image of the original video content, the message including information about content in the image of the original video content on which the message is displayed
   a detection unit to determine in accordance with the similarity determination condition whether or not the detection target is included in the original video content; and
   a composite unit to add the message associated with the detection target to the original video content in a case where a determination result by the detection unit indicates that the detection target is included in the original video content.

2. The video editing device according to claim 1, wherein the storage unit further stores an insertion position where the message is inserted in the original video content, and
   the composite unit inserts the message in the insertion position of the original video content on the basis of the insertion position.

3. The video editing device according to claim 1, wherein the original video content includes image frames,
   the similarity determination condition includes a similarity score condition and a number-of-frames condition indicating a required number of frames satisfying the similarity score condition, and
   the detection unit determines whether or not the detection target is included in the original video content in accordance with the similarity score condition and the number-of-frames condition.

4. The video editing device according to claim 3, wherein in a case where frames satisfying the similarity score condition are consecutive in number that satisfies the number-of-frames condition, the composite unit adds the message to the original video content.

5. The video editing device according to claim 4, wherein in a case where frames satisfying the similarity score condition are consecutive in number that satisfies the number-of-frames condition, the composite unit adds the message to the frames of the original video content that satisfy the similarity score condition.

6. The video editing device according to claim 1, wherein the detection unit compares a feature amount of the original video content and a feature amount of the detection target, thereby calculates a similarity score and determines a similarity therebetween by checking the similarity score against a previously registered similarity determination condition.

7. The video editing device according to claim 1, wherein the storage unit stores, in association with one another, each of the detection target, the similarity determination condition, and the message in the table.

8. The video editing device according to claim 1, wherein the storage unit stores a plurality of different messages, each associated with a different similarity determination condition and a different detection target.

9. A video editing device comprising:
   a storage unit to store, in association with one another, each of a detection target, a similarity determination condition for determining a similarity of an original video content to the detection target, and a message to be displayed on an image of the original video content, the message including information about content in the image of the original video content on which the message is to be displayed;

a detection unit to determine in accordance with the similarity determination condition whether or not the detection target is included in the original video content;

a composite unit to add the message associated with the detection target to the original video content in a case where a determination result by the detection unit indicates that the detection target is included in the original video content;

a target registration unit to receive the detection target and to store the received detection target in the storage unit;

a condition setting unit to receive the similarity determination condition and to store the received similarity determination condition in the storage unit;

an additional information registration unit to receive the message and to store the received message in the storage unit;

a video reception unit to receive the original video content and to store the received original video content in the storage unit; and a video output unit to output the original video content to which the message is added.

10. A video editing method comprising:

storing, in association with one another, each of a detection target, a similarity determination condition for determining a similarity of an original video content to the detection target, and a message to be displayed on an image of the original video content, the message including information about content in the image of the original video content on which the message is to be displayed;

determining in accordance with the similarity determination condition whether or not the detection target is included in the original video content; and adding the message to the original video content in a case where it is determined that the detection target is included in the original video content.

* * * * *